(12) United States Patent
Kamada

(10) Patent No.: US 6,772,394 B1
(45) Date of Patent: Aug. 3, 2004

(54) INTERNET TELEVISION DEVICE CAPABLE OF SELECTING HOT SPOTS BY THE USE OPERATION BUTTONS

(75) Inventor: Tomihisa Kamada, Tokyo (JP)

(73) Assignee: Access Co., Ltd., Tokyo (JP)

( * ) Notice: Subject to any disclaimer, the term of this patent is extended or adjusted under 35 U.S.C. 154(b) by 0 days.

(21) Appl. No.: 08/932,459

(22) Filed: Sep. 18, 1997

(30) Foreign Application Priority Data

Sep. 25, 1996 (JP) .............................................. 8-253174

(51) Int. Cl.[7] .............................................. G06F 15/00
(52) U.S. Cl. ..................... 715/513; 715/501.1; 345/740
(58) Field of Search ................. 707/513, 501, 707/501.1; 709/217, 219, 225, 229; 345/357, 327, 740, 718

(56) References Cited

U.S. PATENT DOCUMENTS

| | | | | |
|---|---|---|---|---|
| 5,481,542 A | * | 1/1996 | Logston et al. ................. | 348/7 |
| 5,515,098 A | * | 5/1996 | Carles ............................ | 348/8 |
| 5,796,952 A | * | 8/1998 | Davis et al. .................. | 709/224 |
| 5,809,242 A | * | 9/1998 | Shaw et al. ................... | 709/217 |
| 5,818,935 A | * | 10/1998 | Maa ............................. | 380/20 |
| 5,838,682 A | * | 11/1998 | Dekelbaum et al. ......... | 370/401 |
| 5,844,552 A | * | 12/1998 | Gaughan et al. ............. | 345/327 |
| 5,907,322 A | * | 5/1999 | Kelly et al. .................. | 345/327 |
| 5,912,664 A | * | 6/1999 | Eick et al. ................... | 345/721 |
| 5,930,808 A | * | 7/1999 | Yamanaka et al. ......... | 707/501.1 |
| 5,937,163 A | * | 8/1999 | Lee et al. .................... | 707/102 |
| 5,961,603 A | * | 10/1999 | Kunkel et al. ............... | 709/229 |
| 5,963,950 A | * | 10/1999 | Nielsen et al. .............. | 707/102 |
| 5,969,714 A | * | 10/1999 | Butcher ....................... | 345/719 |
| 5,970,504 A | * | 10/1999 | Abe et al. ................. | 715/501.1 |
| 5,982,445 A | * | 11/1999 | Eyer et al. ................... | 348/461 |
| 5,991,760 A | * | 11/1999 | Gauvin et al. ................ | 707/10 |
| 6,005,937 A | * | 12/1999 | Lee ............................. | 348/555 |
| 6,006,257 A | * | 12/1999 | Slezak ......................... | 725/110 |
| 6,006,265 A | * | 12/1999 | Rangan et al. .............. | 709/226 |
| 6,034,689 A | * | 3/2000 | White et al. ................. | 345/854 |
| 6,049,835 A | * | 4/2000 | Gagnon ....................... | 709/227 |
| 6,152,369 A | * | 11/2000 | Wilz, Sr. et al. ......... | 235/462.01 |

OTHER PUBLICATIONS

Hood, SGML Markup Declaration for Frames, http://lists.w3.org/Archives/Public/www-html/1996Sep/0011.html, Sep. 3, 1996, pp. 124.*

(List continued on next page.)

Primary Examiner—Stephen S. Hong
Assistant Examiner—Cong-Lac Huynh
(74) Attorney, Agent, or Firm—Dellett & Walters

(57) ABSTRACT

An Internet television device having a capability of connecting to the Internet. An HTML document received from a WEB server includes a definition of assigning operation buttons of a remote controller to hot spots, the definition containing button identifiers indicative of the operation buttons. An Internet television device interprets the received HTML document to develop an image on an image memory. During this interpretation, the button identifiers of operation buttons of the remote controller are recognized so as to create a button assignment table which correlates the recognized button identifiers with hot spots corresponding to anchor tags in the HTML document. The HTML document also includes display information as to which button is assigned to each hot spot. When a user presses an operation button corresponding to a desired hot spot on the display screen, the Internet television device recognizes which hot spot has been designated by referring to the button assignment table and then selects the hot spot. Thus, it is possible to select a desired hot spot on a WEB browser screen in such a manner as in the channel selection of the TV set.

13 Claims, 14 Drawing Sheets

OTHER PUBLICATIONS

Department of the Parliamentary Library, Wait—there's more: the Internet on your very own home television!, Research note 24 1996–1997, pp. 1–3.*

Riiffler et al., InfoRadio on Demand, WebTV and digiTaz — Telecommerce Case Studies, Community Networking May 1996, 3rd International Workshop, pp. 71–76.*

Hicks et al., Consumer Interactive TV: what comes after the digital set–op box/TV combination?, IEEE, Jul. 1994, pp. 71–74.*

"Dedicated Contents Indispensable for the Spread of Internet Household Electric Appliances", Japanese magazine "NIKKEI BYTE", Dec. 1996, pp. 216–225.

* cited by examiner

HTML DOCUMENT
"aaa.html"

```
<HTML>
 <HEAD>
 <TITLE> TITLE </TITLE>
 </HEAD>
 <BODY>
  This is a body part.
    • • • • •
  <A HREF="bbb.html">BBB</A>
    • • •

<A HREF="ccc.html"><IMAG
 SRC="ggg.gif"></A>
    • • •

</BODY>
</HTML>
```

BROWSER SCREEN

<P ALIGN=center>

1:
                                     131

<A HREF= "SHINSHUa.html" keybind= "1"><IMG SRC= "tree.gif"></A>

<BR>
                                   132

<A HREF= "SHINSHUb.html" keybind= "2"> 2: TRAFFIC</A>

<P>

3:HOTELS <BR>
                                 133

<A HREF= "SHINSHUc.html" keybind= "3"><IMG SRC= "hotel.gif"</A>

<P ALIGN=center>
                                 134

<A HREF= "SHINSHUd.html" keybind= "4"> 4: GUIDE</A>

.

.

.

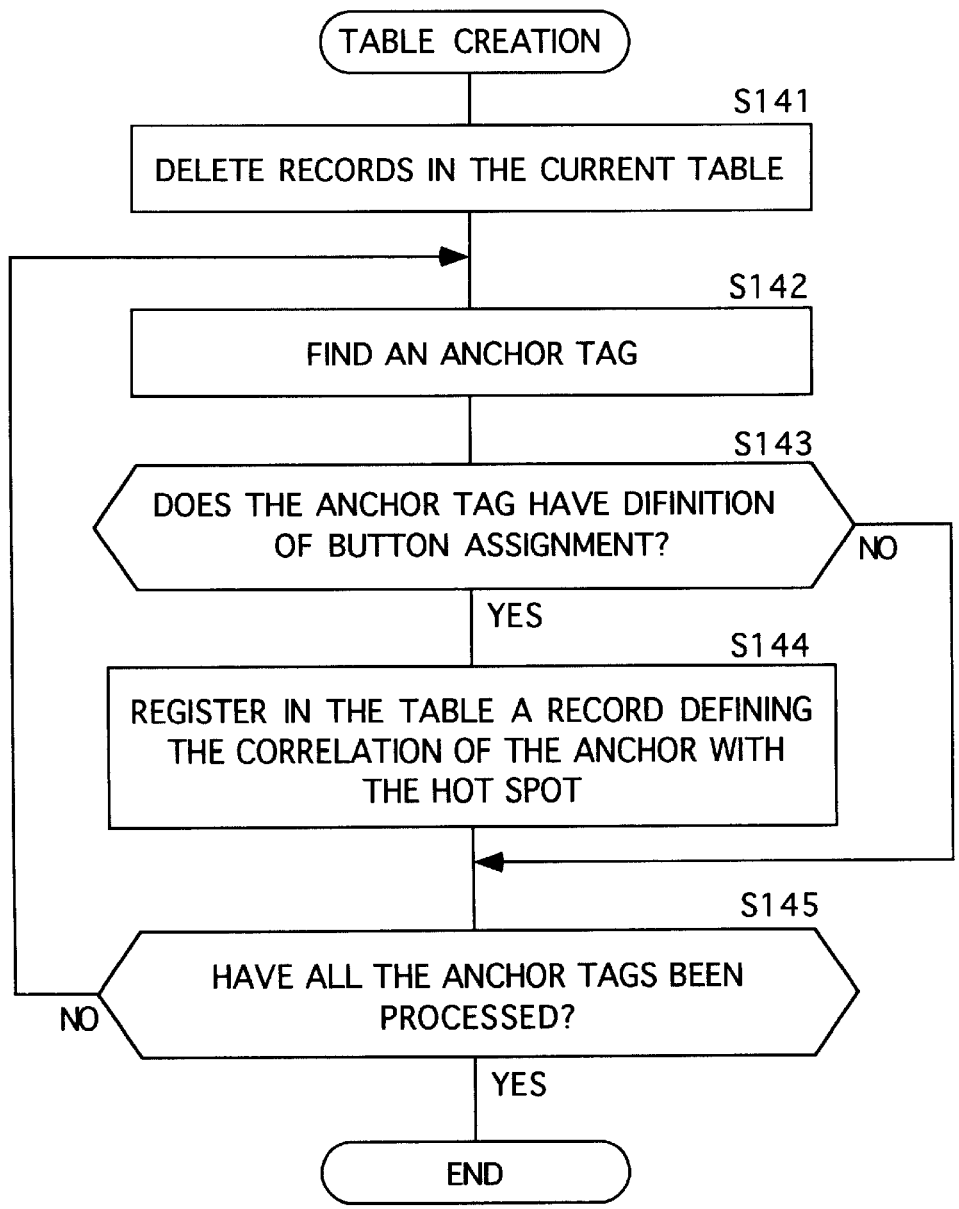

INTERNET TELEVISION DEVICE CAPABLE OF SELECTING HOT SPOTS BY THE USE OPERATION BUTTONS

BACKGROUND OF THE INVENTION a. Field of the Invention

The present invention generally relates to an Internet television device, i.e., a television set with capability of connecting to the Internet, and particularly to a method for correlating so-called hot spots, which are selectable items in a home-page of the Internet, with operation buttons of a remote controller of the television device so as to directly select the hot spots by using the operation buttons.

b. Related Art

Conventionally, the Internet access usually requires that a personal computer to be used and a user has at least a minimum of computer-related knowledge. Specifically, a keyboard was needed for the operation, which made it difficult for users who are unfamiliar with the keyboard, to operate it. For this reason, the participants in the Internet tended to be limited to experts, not widely opened to public people.

A TV game machine is known as a handy type of hardware configuration to access the Internet. In this case, the operation is conducted with a controller attached to the game machine. The controller allows a remote control of the game machine, but is configured to use a cable line, which connects the controller to the game machine, for the original purpose of the same. The controller is to be manipulated with two hands and hence it is troublesome to operate it. Further, it was bothersome to trail the cable around, making it inconvenient to use the controller.

The applicant has proposed a TV device with an Internet accessing capability in Japanese Patent Application No. 8-246528. This TV device allows a user, with a single-hand-operable wireless remote controller similar to that for the prior art TV sets, to control the focussing on hot spots in a home-page by using cursor motion keys which are provided on the remote controller. With a desired hot spot focussed, a press of a SELECT button causes a selection of the hot spot.

However, such operation using the cursor motion keys and SELECT button is not easy to use and, hence, it is desirable to be capable of more simply and conveniently pointing and selecting a hot spot.

SUMMARY OF THE INVENTION

It is an object of the invention to provide a method and device which makes it possible to easily select a hot spot on a given home-page of the Internet.

It is another object of the invention to control an Internet television device with a remote controller similar to that for the prior art television sets, so as to perform a wireless control of the Internet television device with a simple operation.

It is yet another object of the invention to provide a method and device capable of reducing the number of operations required for a user to select a desired hot spot in an HTML document on a display screen.

It is a further object of the invention to provide a method and device capable of assigning operation buttons to hot spots respectively in an HTML document on a display screen.

According to the invention, there is provided a method for selecting, with operation buttons, hot spots on a WEB browser display of an Internet television device, comprising the steps of: receiving an HTML document from a WEB server; detecting button identifiers of operation buttons which are preset in the received HTML document and associated with anchor tags existing in the same; creating a button assignment table which defines a matching relationship between the detected button identifiers and hot spots corresponding to the anchor tags; determining which one of the hot spots has been designated by a user by referring to the button assignment table on the basis of one of the operation buttons operated by the user; and selecting the thus determined hot spot.

Preferably, when creating the HTML document at the site of the WEB server, statements specifying the button identifiers for the associated operation buttons are put in the associated anchor tags corresponding to the respective hot spots to which the operation buttons are to be assigned. Also, when creating the HTML document at the WEB server, display information is added in the document in association with each hot spot, which indicates which operation button is assigned to that hot spot.

According to another aspect of the invention, there is provided an Internet television device capable of connecting to the Internet, comprising: means for accessing a WEB server on the Internet; means for storing HTML documents received from the WEB server; means for interpreting the HTML documents and drawing an image on an image memory; a display on which the drawn image is displayed; a wireless remote controller for remotely controlling the Internet television device; means for detecting button identifiers of operation buttons of the remote controller which are preset in the received HTML document and associated with anchor tags existing in the same and for creating a button assignment table which defines a matching relationship between the detected button identifiers and hot spots corresponding to the anchor tags; means for determining which one of the hot spots has been designated by a user by referring to the button assignment table on the basis of one of the operation buttons operated by the user and for selecting the thus determined hot spot.

The Internet television device may be embedded in a TV set. Alternatively, this device may be realized in the form of an external device of a prior art TV set, which provides the TV set with a capability of connecting to the Internet. In the latter case, it is preferable to use the remote controller commonly for the TV set.

With the invention, it is possible to select a desired hot spot with only one press of an operation button in a home-page of the Internet, as in the channel selection of the TV set.

The invention will be more clearly understood from the following description of some embodiments thereof given by way of example only with reference to the accompanying drawings.

BRIEF DESCRIPTION OF THE DRAWINGS

FIG. 13 shows an example of the HTML document corresponding to the screen shown in FIG. 1; and FIG. 14 is a flowchart which shows a procedure for creating a button assignment table shown in FIG. 3.

DETAILED DESCRIPTION OF THE PREFERRED EMBODIMENTS

Figure 5:
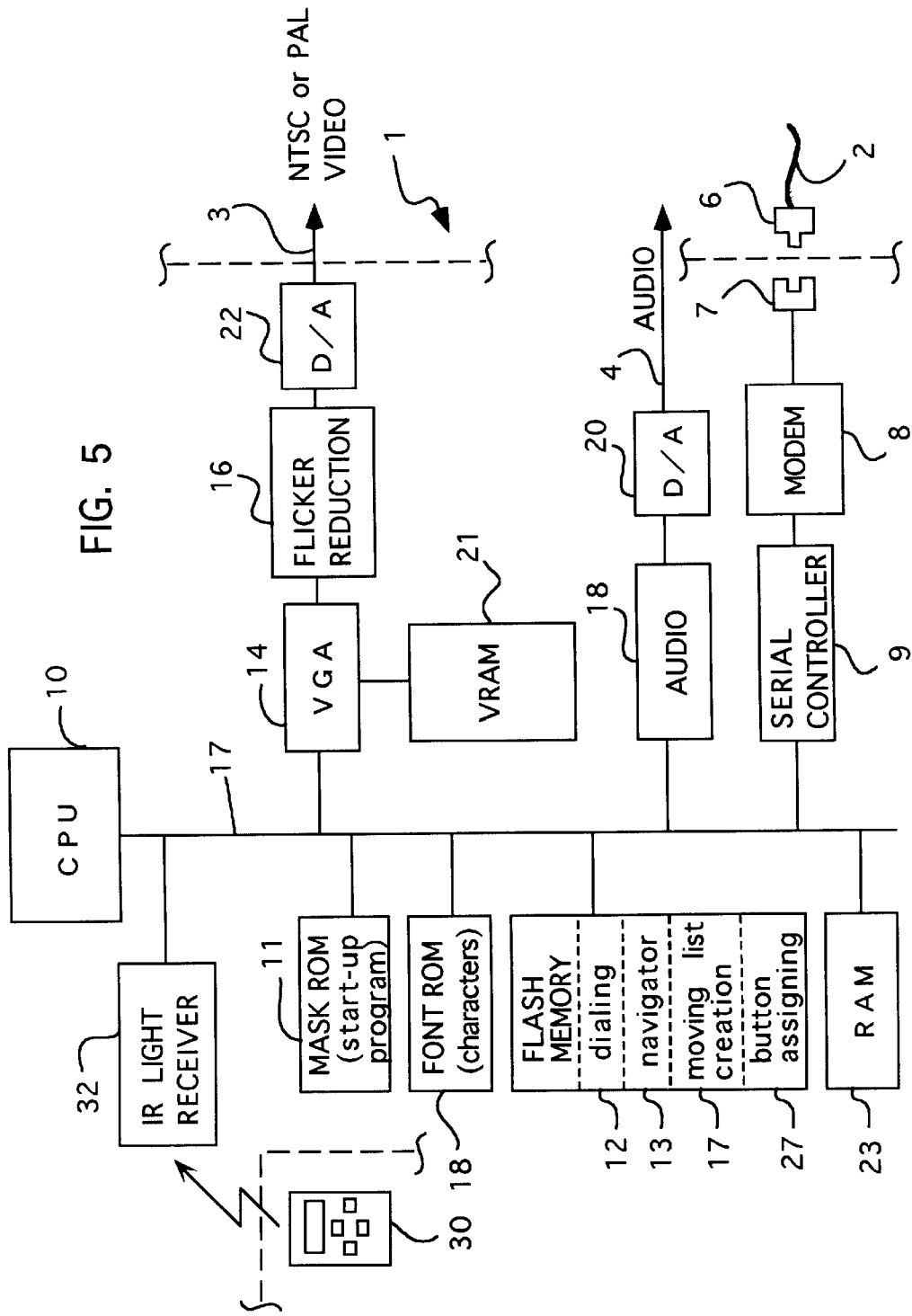
FIG. 5 is a block diagram which shows an exemplary configuration of a main part of the Internet television device according to an embodiment of the invention.
Figure 6:
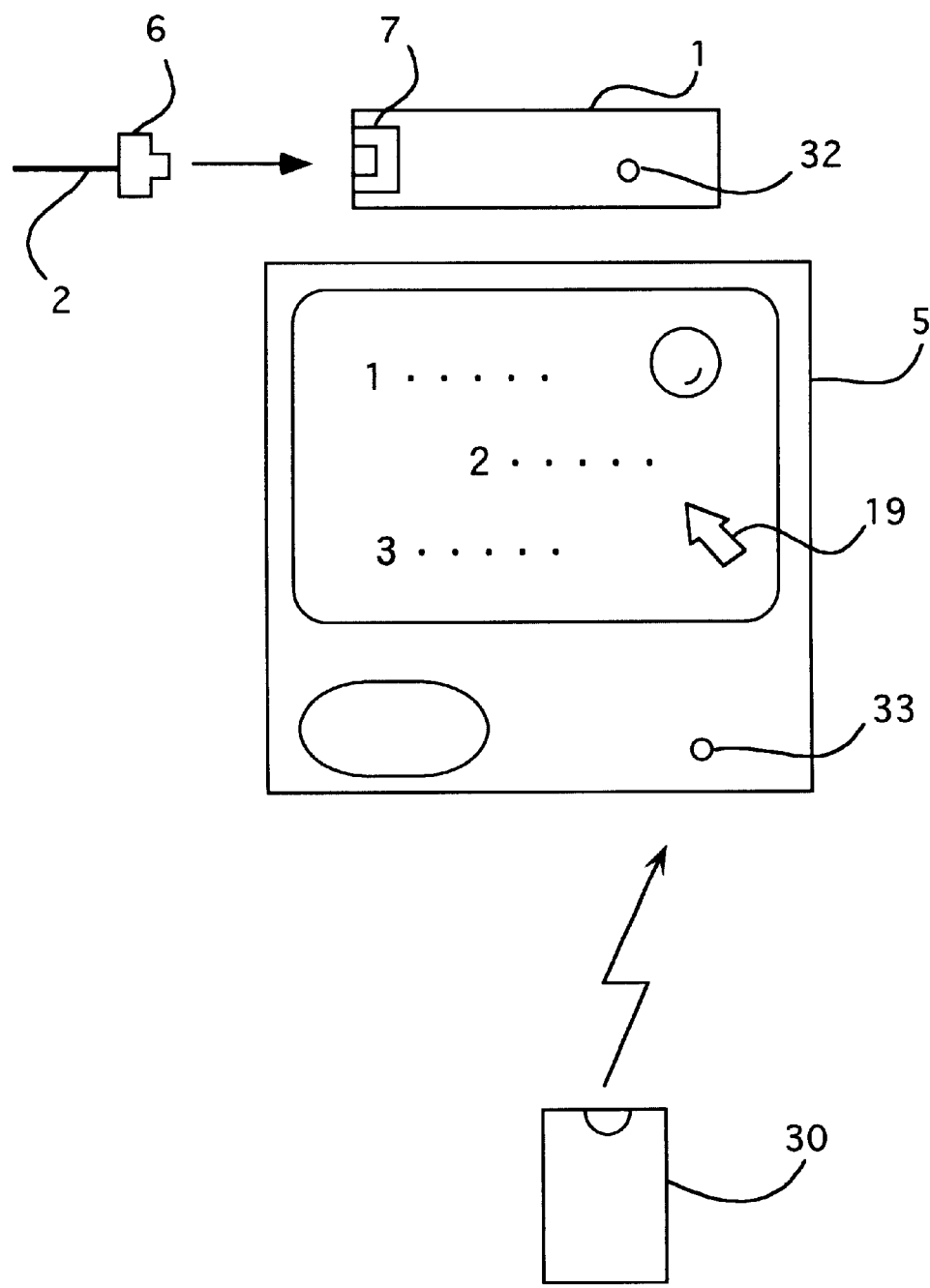
FIG. 6 shows an external appearance of the configuration of the Internet television device according to the embodiment of the invention.

An example of the invention will be described by referring to the attached drawings. Referring first to FIGS. 5 and 6, a set-top box type or non-built-in type Internet television device 5 will be explained below.

Referring to FIG. 6, an external Internet unit 1 is provided on a common TV set 5. The Internet unit 1 includes a modular jack 7 which accepts a telephone line 2. The jack 7 is engagable with a modular plug 6 which is connected to the end of the telephone line 2. The Internet unit 1 is connected with the TV set 5 via video and audio lines which will be described below. The TV set 5 and the Internet unit 1 constitutes an Internet television device of the invention.

An IR light receiver 32 is provided on the front face of the Internet unit 1 for receiving a signal sent from a light emitter of a separate remote controller 30. The signal from the light emitter is also receivable by an IR light receiver 33 of the TV set 5.

Referring now to FIG. 5, an example of configuration inside the Internet unit 1 will be explained hereinafter. The modular jack 7 of the Internet unit 1 is connected to a modem 8, which sends data received at the jack 7 to RAM 23 via a serial controller 9. A button assigning program 27 interprets the data stored in the RAM 23 to detect button assignment information as described more in detail below.

A CPU (central processing unit) 10 is connected via a bus 17 with a mask ROM storing an Internet start-up program 11, a flash memory storing a dialing program 12, a navigator program 13, a moving list creation program 17 and a button assigning program 27, and a character font ROM 18. These programs could be stored in one ROM. However, some of them are preferably stored in a rewritable non-volatile memory such as the flash memory, for easier updating.

The start-up program 11 also includes an initial screen image together with the start-up program. The dialing program 12 includes a connecting procedure program as well as data of the telephone number of an Internet provider. The character font memory 18 stores characters and symbols, from which the CPU 10 reads out image patterns of character fonts in response to the codes of given characters and symbols.

The navigator program 13 is a program which decodes data of a home-page written in the HTML as described below to construct a display image, controls jumps to linked destinations, communicates with servers, etc.

Figure 2:
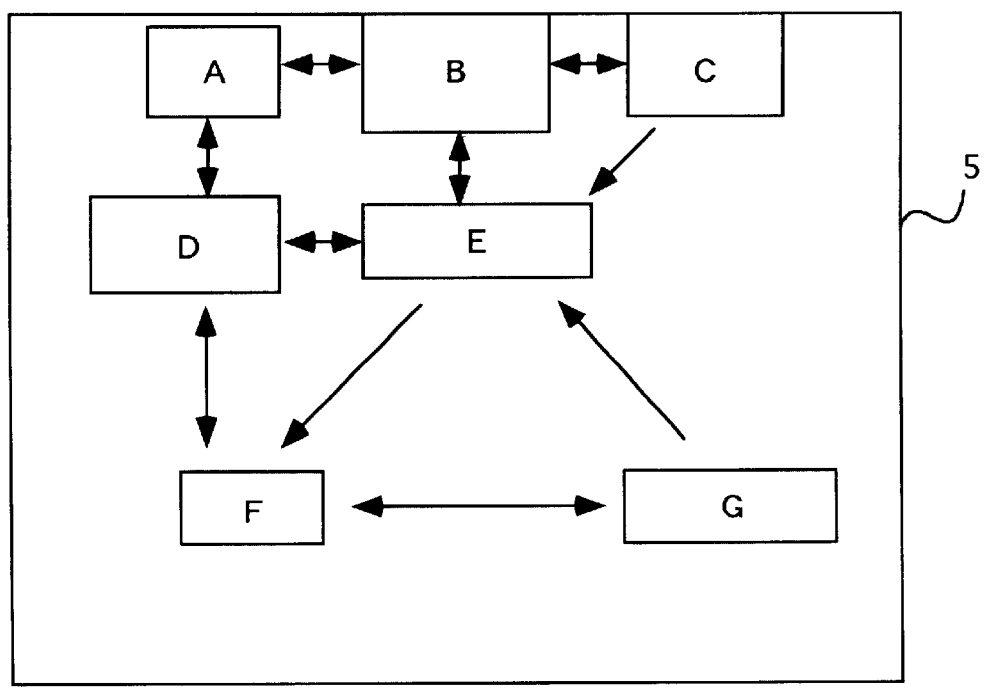
FIG. 2 is a diagram for explaining a moving pattern of a cursor responsive to an operation of a cursor motion key in the Internet television device of the invention.

The moving list creation program 17 is to detect selectable positions in a home-page, i.e., hot spots (usually, underlined or colored words or framed images) and temporarily stores the result of the detection in the RAM 23. The moving list creation program 17 then extracts, from data of the home-page which changes screen by screen, a cursor motion pattern corresponding to the data. More specifically, the moving list creation program 17 extracts for example a cursor motion pattern as shown in FIG. 2. The cursor motion pattern represents a matching relationship between hot spots based on which a cursor is allowed to jump from one hot spot to another according to the operation of the cursor motion key 44 (mentioned below) of the remote controller 30. In this embodiment, the state in which a cursor 19 (FIG. 6) is placed on a selectable hot spot, is referred to as "focussed". The focussing could be realized on a display not only by the cursor 19 but also by emphasized representation of the hot spot such as inversion or flickering of the same. In the example shown in FIG. 2, a cursor motion pattern is defined among the hot spots A, B, C, D, E, F and G, as indicated by arrows. For example, assume that the cursor is now on the hot spot A, which is a candidate to be selected by the user at that time. If a "RIGHT" motion is indicated by the cursor motion key 44 and cursor motion pattern, then the cursor jumps to the hot spot B. If a "DOWN" motion is indicated by the cursor motion key 44, then the cursor jumps to the hot spot D. Likewise, the cursor located on the hot spot G will jump to the hot spot F in response to a "LEFT" indication of the cursor motion key 44 and to the hot spot E in response to an "UP" indication. Similarly, the cursor on the hot spot E will jump to the hot spot D in response to a "LEFT" indication, and to the hot spot F in response to a "DOWN" indication. In this way, by using the cursor motion key 44, the user can directly move the cursor now at a location of a focussed hot spot to another adjacent hot spot on the display screen, thus improving the user operability of the system.

The button assigning program 27 is to detect the definition of assignment of the remote controller's buttons to hot spots in the home-page, and temporarily stores the detected result in the RAM 23. Thus, the button assigning program 27 extracts information of the remote controller's buttons associated with the respective hot spots, based on the anchor tag data of the home-page, which changes screen by screen.

An audio controller 16 and a video control circuit 14 are connected via the bus to the CPU 10. The audio controller 19 generates audio element data. The audio element data are converted by the audio D/A converter 20 into an analog audio signal which will be sent via an audio line 4 to an audio input of the TV set 5, or alternatively, converted into sounds by built-in speakers (not shown). The video control circuit (VGA) 14 is to convert character patterns and digital data of images sent from the CPU 10 to a display signal (image data) by using the video RAM 21 and to pass the display signal to a flicker reduction circuit 15.

The flicker reduction circuit 15 acts to perform a scan conversion and reduce the flickering of the video signal. The digital display signal from the flicker reduction circuit 15 is then input to the image D/A converter 22. The D/A converter 22 outputs an NTSC or PAL analog video signal via a video input line 3 to the TV set 5. The flicker reduction itself is not directly relevant to the invention and realized by arbitrary prior art technique.

Figure 4:
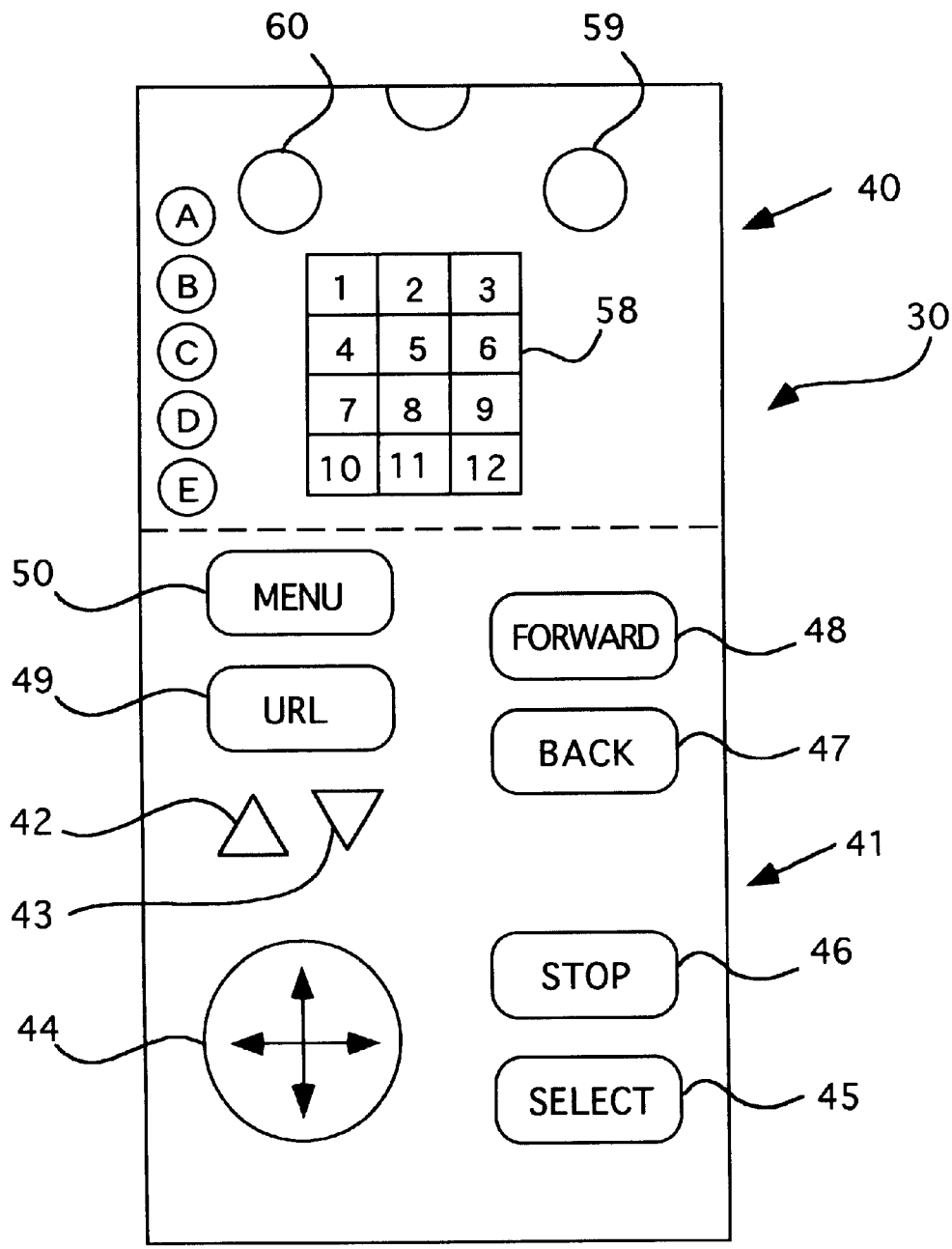
FIG. 4 shows an appearance of an exemplary remote controller for the Internet television device of the invention.

Referring next to FIG. 4, there is illustrated an example of the configuration of the remote controller 30. In the example shown, the remote controller 30 has at its upper half a group of operation buttons 40 which include a power button 59, a video/TV switching button 60, numeral channel buttons 58, etc. At the lower half of the remote controller 30 are operation buttons 41 for the Internet operation. The operation buttons 41 include a scroll UP button 42 and DOWN button 43 for scrolling the image upward and downward, respectively, a cursor motion key 44 for moving the cursor 19 upward, downward, leftward or rightward on the screen, a SELECT button 45 for selecting a hot spot focussed or designated by the cursor 19, a STOP button 46 for stopping an operation or execution of the device, a BACK button 47 for going back to the previous page, a FORWARD button 48 for going to the subsequent page, a URL (address) button 49 for directly designate a URL by using a software keyboard (not shown), and a MENU button 50 for opening a menu screen.

Although illustrated in the form of a single key, the cursor motion key 44 may be configured by four separate, UP, DOWN, LEFT and RIGHT, keys.

Now, an explanation will be given of the structure of information of a home-page. The information of a home-page sent from a WEB server is defined in a hypertext markup language (HTML). The document written in the HTML, itself, is a text file, in which character styles or layout information are specified by a code or codes sandwiched by left and right angle brackets "<" and ">", called "tag". The tags are interpreted by the navigator program 13, namely a WEB browser, to display the HTML document on a screen.

The HTML document is able not only to incorporate in itself other text, image or audio data but also to link itself with images or other HTML documents. That is, by linking or correlating a position in document (hot spot or anchor point) with another position of the same document or with another file, it is possible to readily jump from that position to the linked destination, allowing very efficient browsing of a wide variety of documents (including so-called multimedia). Also, it is possible to move to a screen for sending an E-mail upon the selection of a hot spot, or to activate a particular function related to that hot spot. Thus, if such hot spots are preset to various items in an HTML document, a user's selection of one of the hot spots will enable the browsing of a document or activating one of the various functions corresponding to that hot spot.

Figures 12A, 12B:
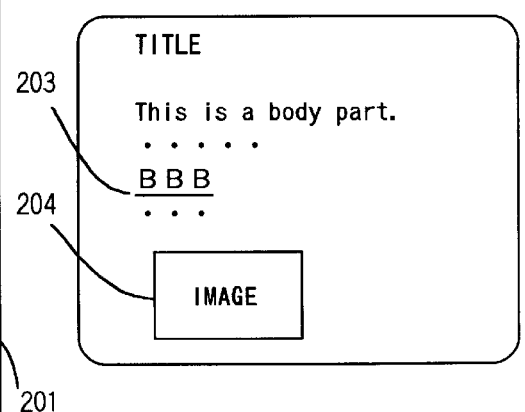
FIGS. 12A and 12B show a configuration of an HTML document and its appearance of a browser screen, respectively.

In FIG. 12A, there is shown a basic structure of an HTML document. As mentioned above, the HTML document is inherently a text file and includes built-in codes called tags (each tag being defined by angle brackets "<" and ">") present in the document. Usually, a specified area is sandwiched by a pair of tags, start tag "< . . . >" and end tags </ . . . >. The end tag is differentiated from the start tag by including "/".

However, there are some tags which are each used alone, such as <P> for paragraphing and <BR> for a line break. These tags allow settings of character style and layout information as well as link information. The WEB browser decodes these tags and displays the HTML document in the form as intended by the creator of the document, and controls links which are set in the documents.

The basic structure of the HTML document is, as shown in FIG. 12A, one which contains various tags in the text document. When the HTML document is decoded by the WEB browser and displayed on a screen, as seen from FIG. 12B, the tags are not displayed but only what is indicated by the tags is reflected on the display. The function is called "link", in which when a user selects, for example, a particular character string to which a hot spot is set, in an HTML document, the display jumps to the location related to that particular character string.

In FIG. 12A, the HTML document named "aaa.html" includes a position 201 which states:

<A HREF="bbb.html">BBB</A>

The tags <A . . . > . . . </ . . . > used for setting a link are called anchor tags and the part sandwiched by them is called "hot spot" or "anchor point". The "A HREF=" in the start tag "<A HREF=" bbb.html">" of the anchor tags denotes information for accessing the linked destination, here, a file name. With respect to this part of the anchor tags, as shown at 203 in FIG. 12B, character string "BBB" is distinguishably displayed on the browser screen. This distinguishable display is achieved by changing color of the character string from the colors of other character strings, or underlining. This clearly notifies the user that the distinguished character string, if selected, leads him or her to another location.

Also, another position 202 (FIG. 12A) defines an inline image to be a hot spot. In this case, an image file named "ggg.gif" is displayed as an image 204 (FIG. 12B). If this image 204 is selected by the user, then the content of the linked destination "ccc.html" will be fetched and displayed. The inline image is referred to as an image which is displayed, embedded within an HTML document.

Figure 1:
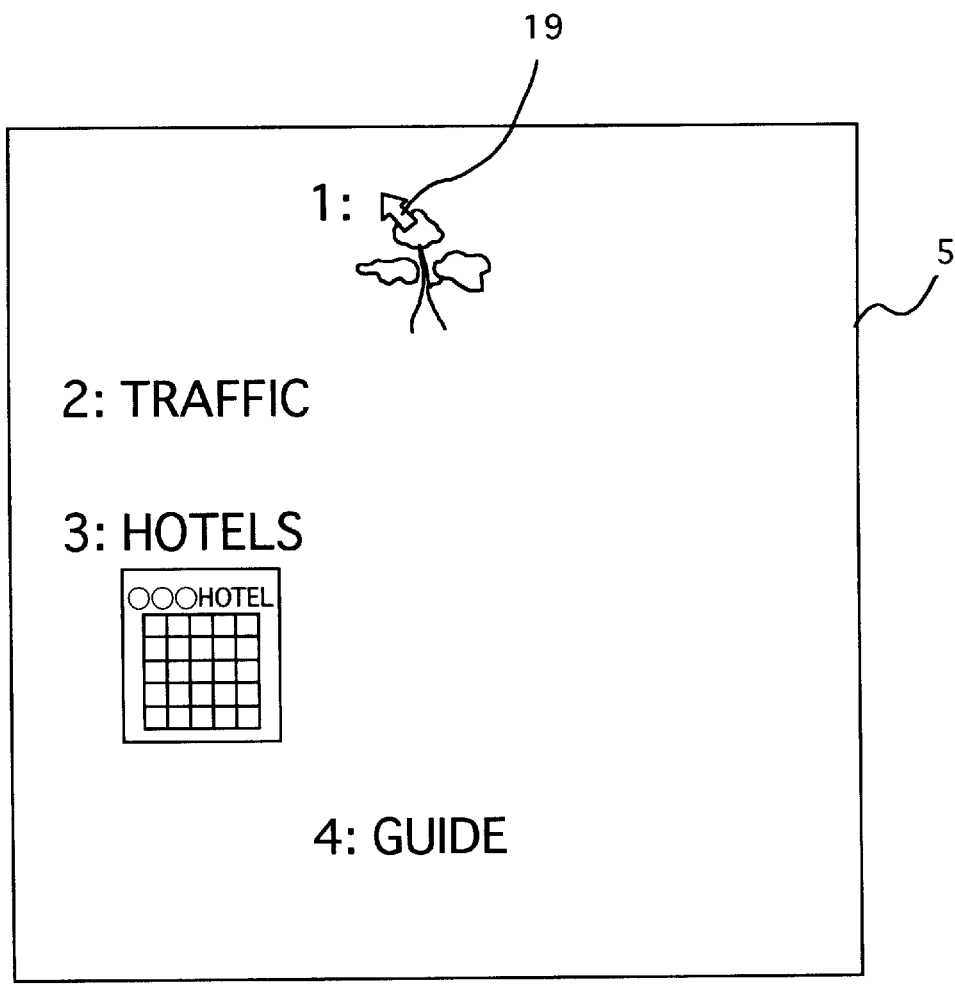
FIG. 1 shows an example of assignment of numerical buttons of a remote controller to hot spots on a display of an Internet television device according to the invention.

According to the invention, a definition of matching relation between hot spots and remote controller's buttons is preset in an HTML document as button assignment definition information. The assignment definition information does not appear on a usual home-page screen (browser screen) and hence not viewed by the user. However, a plurality of hot spots in the same screen or home-page should be recognized distinguishably with one another. For example, assignment definition information (button identifier) is used which allows a unique recognition of each hot spot by assigning serial numbers to them. This is not sufficient because it is unknown to the user which buttons have been assigned to respective hot spots. Then, in order to notify the user which button has been assigned to each hot spot, characters to be displayed to indicate it are put in the HTML document in correspondence with respective hot spots, as shown in FIG. 1.

The button assigning program 27 decodes the button assignment definition including button identifiers embedded in a home-page, and dynamically creates a button assignment table. Therefore, the matching relationship between the hot spots and the associated operation buttons could change home-page by home-page.

Figure 3:
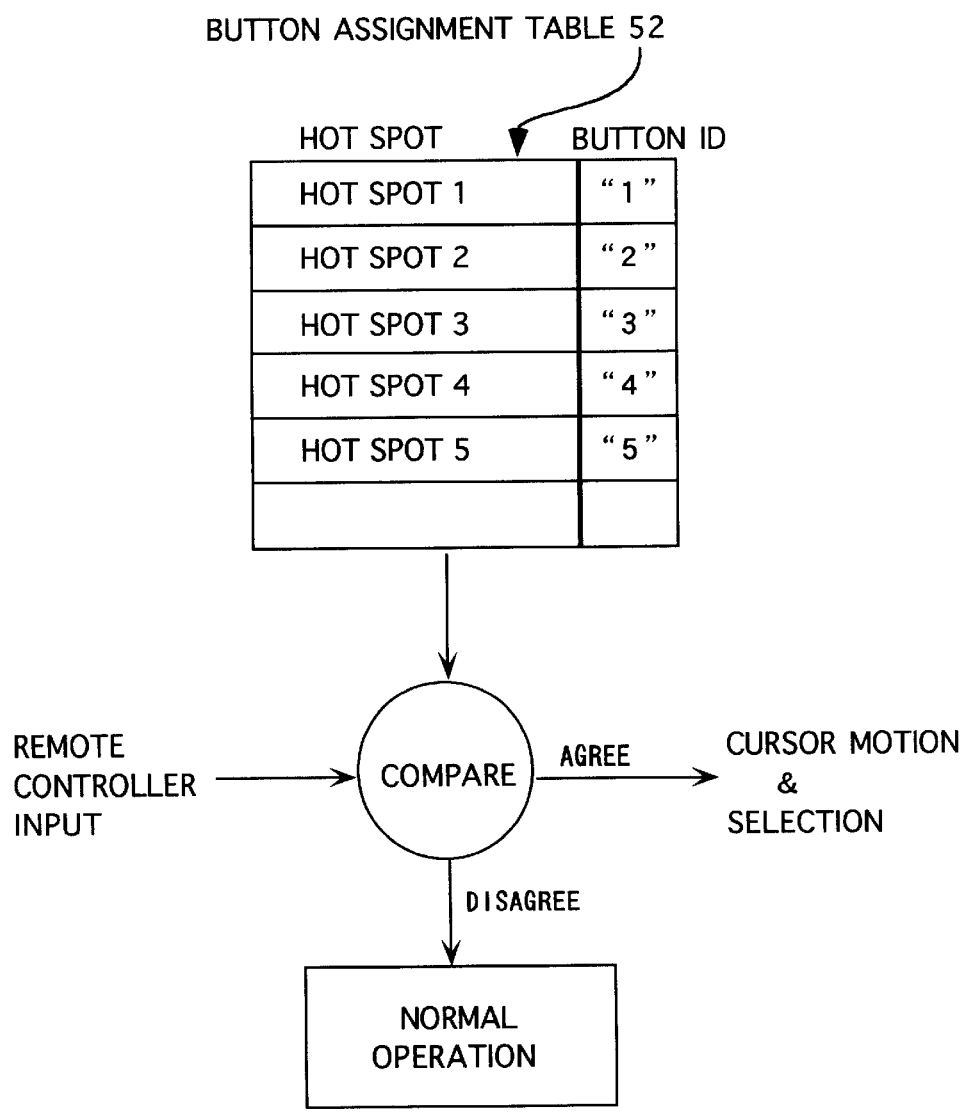
FIG. 3 shows a basic concept of a method of assigning remote controller buttons to hot spots in the Internet television device of the invention.

Referring now to FIG. 3, a detailed explanation will be given of an example of configuration and function of the button assigning program 27. The button assigning program 27 acquires an internal cache in RAM 23 and a comparison operator 51 executes operations such as comparison, shift, code conversion and the like.

The button assignment definition embedded in a home-page is interpreted by the code conversion operation, so that the matching information of hot spots and numerals or symbols is stored in the button assignment table 52 in the cache memory or the like.

For example, in the case shown in FIG. 1, "1: TREE" (image), "2: TRAFFIC" (character), "3: HOTEL" (image), "4: GUIDE" (character) are extracted from the home-page. When the Internet unit 1 accepts an input code, for example, "1" from the remote controller 30, then the CPU 10 executes a comparison operation. The comparison operator 51 compares the received "1" with the button identifiers stored in the button assignment table 52 such that a hot spot (hot spot 1) with a button identifier ("1") having matched with the received code is selected so as to cause the cursor to relocate to that hot spot and to SELECT (activate) the same. With this arrangement allows a user to select a desired hot spot by one-touch operation as in the selection of TV channels, without using the cursor motion key 44.

Referring next to the block diagram of FIG. 6, an explanation will be given of the operation of the TV device shown in FIG. 5. Now, assume that the plug 6 of the telephone line 2 is in connection with the jack 7 of the Internet unit 1. When a user presses the power button 59 of the remote controller 30, the IR light receiver 32 receives the signal to power on the circuitry in the Internet unit 1. At the same time, the TV set 5 is also powered on by that signal. Then, the start-up program 11 is activated so that the CPU 10 reads out initial menu screen data, to display the data on the screen of the TV set 5 as shown in FIG. 9.

Figure 9:
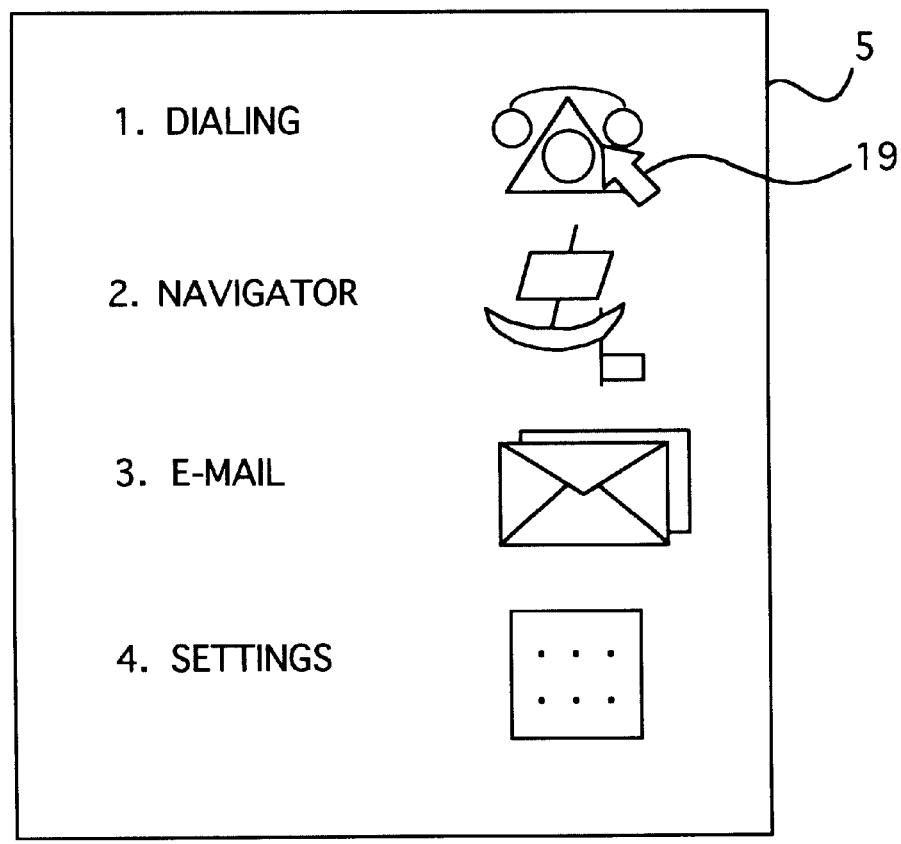
FIG. 9 shows an example of an initial menu screen of the Internet television device of the invention.

The screen of FIG. 9 has a cursor 19 initially located on the hot spot of "1: DIALING" so that even a beginner can readily start the Internet connection, although this is just an example and the initial position of the cursor 19 may be at an arbitrary position.

If the user presses the SELECT button 45 of the remote controller 30, then CPU 10 activates the dialing program 12 so as to read out a telephone number of a provider, an ID number and a password of the user into the RAM 23, and commands the modem 8 via the serial controller 9 to perform a dialing. The modem dials the telephone number of the provider so as to establish a connection between the Internet television device and the provider. Then, the provider sends an inquiry to the Internet television device as to the ID number and the password of the caller. The CPU 10 returns them according to the dialing program 12, thus enabling a data communication between the provider and the Internet unit 1. An icon (not shown) indicative of being connected with the provider may be displayed on the screen of the TV set 5.

In the connected state, if the user presses the menu button 50 of the remote controller, then the initial menu screen of FIG. 9 is again displayed on the TV set 5. If the user indicates "DOWN" motion by the cursor motion key 44, then the cursor 19 moves from "1: DIALING" onto the characters of "2: NAVIGATOR" so that the cursor 19 is overlapped on the characters. At this time, if the SELECT button 45 is pressed, then the navigator program 13 is activated so that an initial home-page screen appears on the display.

Figure 11:
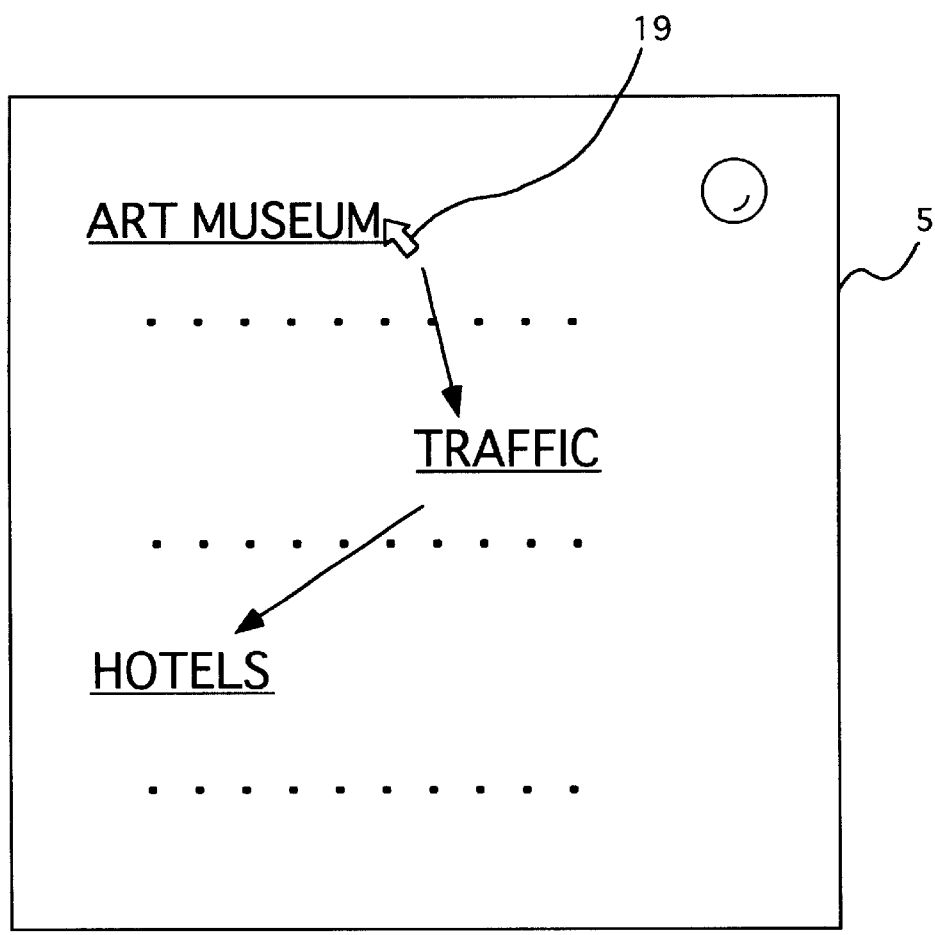
FIG. 11 shows a moving pattern of a cursor corresponding to a home-page in the Internet television device of the invention.

Referring next to FIG. 11, an explanation will be given of an operation to move the cursor 19 by using the cursor motion key 44. The CPU 10 receives an HTML document, for example, corresponding to the image data as shown in FIG. 11 from the Internet and stores the data in the RAM 23. This screen shows a home-page in which hot spots are indicated, in FIG. 11, by underlining the character strings to which the hot spots are set. The moving list creation program 17 detects the above-mentioned anchor tags in the home-page and recognizes the coordinate position of the respective hot spots on the display screen.

The positional relationship between the hot spots such as "ART MUSEUM", "TRAFFIC", "HOTEL" in the home-page screen of FIG. 11 is analyzed so as to detect the pattern of the hot spots A–G as shown in FIG. 2. For example, in FIG. 11 assume that the cursor 19 is now on the upper position of the screen. Then, when the user wants to get the "HOTEL" information, two successive indications of the "DOWN" with the cursor motion key 44 will cause the cursor 19 to directly jump first to the "TRAFFIC" which is located just below the previous cursor position, and next to the "HOTEL" which is located at the lower left position. With the cursor 19 overlapped on the "HOTEL", a press on the SELECT button 45 leads to another home-page, for example, of information relating to hotels.

Figure 10:
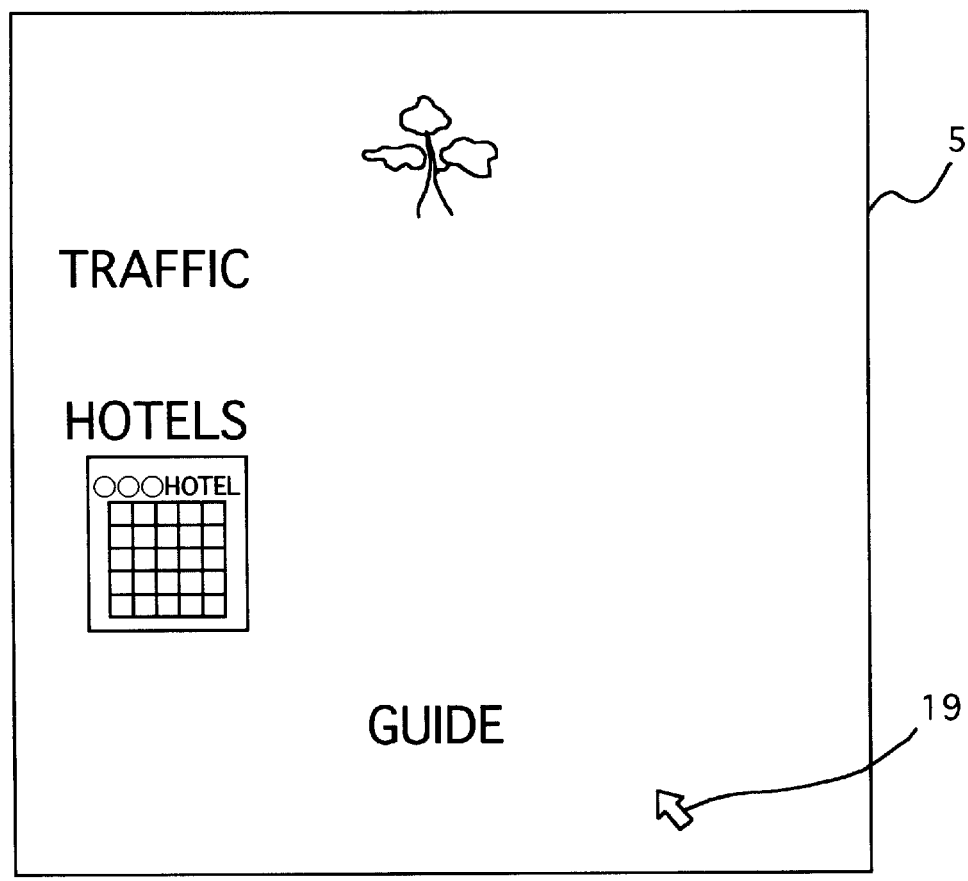
FIG. 10 show an example of hot spots of a usual home-page.

Referring next to FIGS. 1 and 10, instead of the manipulating of the cursor key 44, an explanation will be given of how a hot spot can be selected by the use of channel buttons 58 which are originally for designating TV channels. For example, as shown in FIG. 10, assume that a home-page of "SHINSHU" is displayed on the screen which includes four hot spots respectively set to "TREE" (image), "HOTEL" (image), "GUIDE" (character). Also, assume that the hot spots of this home-page are assigned with button identifiers (button IDS) as shown in FIG. 1.

FIG. 13 shows how this is implemented in an HTML document. As seen from this Figure, each of anchor tags 131–134, to which hot spots are set, includes a statement "keybind=x", where "x" denotes a character or character string indicative of a button identifier. With this addition of the statement to the anchor tag, the hot spots are assigned with the respective button identifier "x". Upon receipt of such an HTML document, the button assigning program 27 analyzes and creates the button assignment table 52, as mentioned above with reference to FIG. 3, which correlates the hot spots with the respective operation buttons of the remote controller 30.

Further, as shown in FIG. 1, in order for a user to recognize on the home-page screen which buttons are assigned to the hot spots, the button identifiers are built in the HTML document as display data in association with the respective hot spots as "1: TREE" (image), "2: TRAFFIC" (character), "3: HOTEL" (image), "4: GUIDE" (character). As a result, the user can readily identify which button is to be pressed to select a desired hot spot. For example, when the user wants to get information about the promenade in woods of SHINSHU: "TREE" (image), the home-page screen of FIG. 1 tells that the button "1" of the channel buttons 58 on the remote controller 30 will lead him or her there. This operation is exactly the same as that of selecting the channels of the TV set and quite easy to handle with no mistakes.

FIG. 14 shows an example of a process to create the button assignment table 52. This process is activated each time an HTML document of a new home-page is displayed. First, the records in the current button assignment table 52 is deleted (S141). Instead, the current button assignment table may be left as an old button assignment table so that the table is reused when that page is recalled. Then, the HTML document is interpreted from the head thereof to find any anchor tags (S142). If a given anchor tag has no definition of the button assignment (S143), control jumps to step S145 which will be described below. If such a definition is present on the given anchor tag, a record is newly added to the button assignment table 52, which correlates the hot spot of the anchor tag and the operation button specified in the statement of the anchor tag (S144). Such processing is iterated with all of the anchor tags found in the HTML document to be displayed (S145), thereby completing the creation of the button assignment table 52.

The Internet unit 1 receives a code or number, e.g., "1", from the remote controller 30, when operated, and sends it to the comparison operator 51 (FIG. 3). The comparison operator 51 compares the received number, namely "1", with the button identifiers in the button assignment table 52 so as to find a hot spot which has a button identifier matching the number, "1", and then causes the cursor to move onto that hot spot to select the same.

In the "promenade in woods" home-page, when for example a music or female voices are fetched, the CPU 10 sends the audio data to the audio controller 16 (FIG. 5). The audio controller 16 decodes and sends the data to the audio D/A converter 20 which in turn converts the data into an analog audio signal to forward it via the audio line 4 to the speaker of the TV set 5.

The image data of the GUIDE of the "promenade in woods" home-page is directly sent to the video control circuit 14 while code data of characters and symbols are converted by the use of the character font memory 18 into pattern data and sent to the video control circuit 14. The video control circuit 14 develops display screen data on the video RAM 21 based on the image data and pattern data. This image data is read out and sent to the flicker reduction circuit 15.

The screen data are processed in the flicker reduction circuit 15 to reduce the flicker, and then sent to the D/A converter 22. The D/A converter 22 converts the display screen data into an analog signal and sends the analog NTSC or PAL signal via the video line 3 to the video circuit of the TV set 5.

According to the assignment of buttons to the hot spots, just one press of a remote controller button enables a selection of any desired hot spot in a home-page. The remote controller buttons can be arbitrarily assigned to numeral buttons home-page by home-page. If the remote controller has symbol buttons like "A"–"E" as shown in FIG. 4, hot spots can also be assigned to such symbol buttons.

Figure 7:
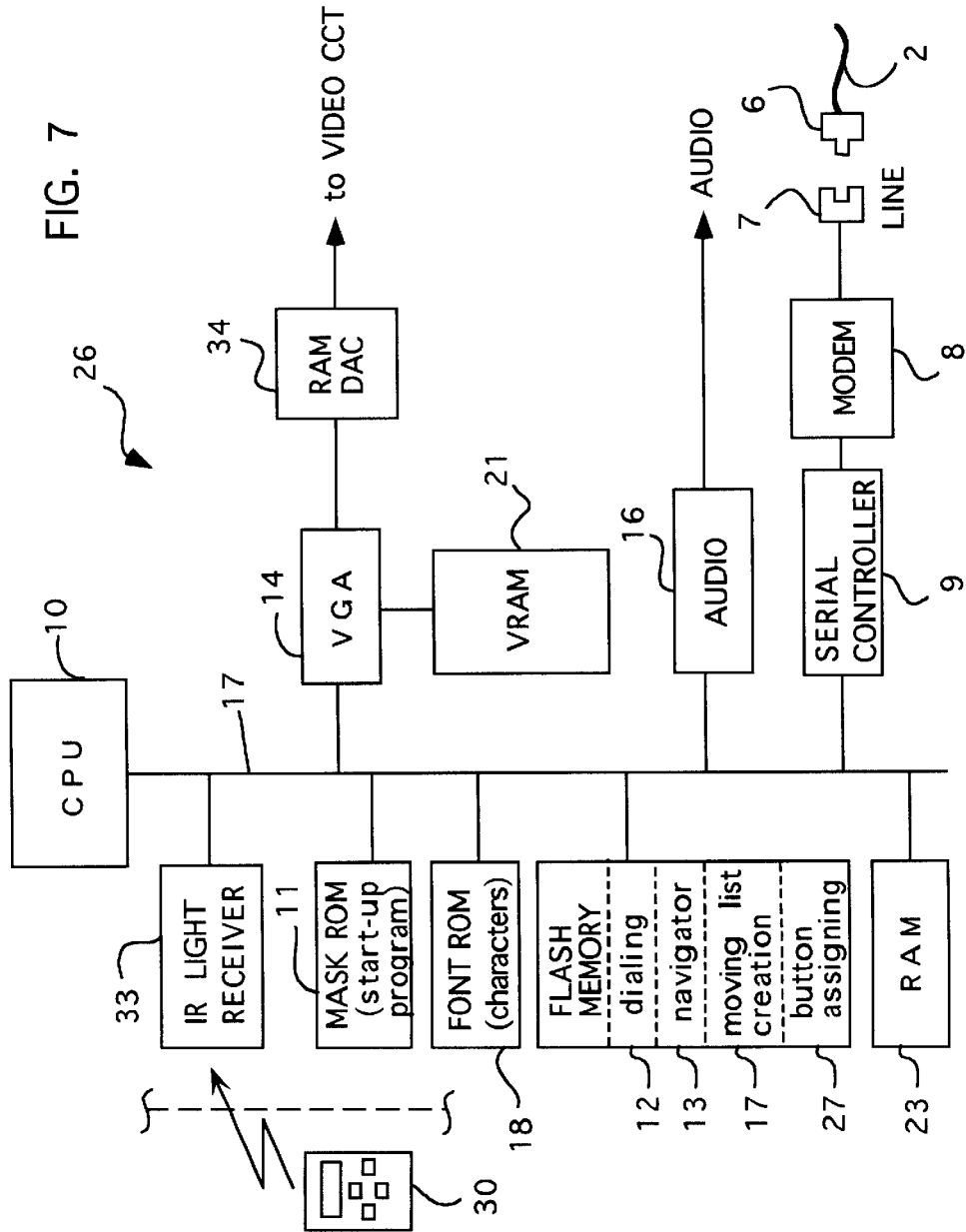
FIG. 7 is a block diagram which shows an exemplary configuration of a main part of the Internet television device according to a second embodiment of the invention.
Figure 8:
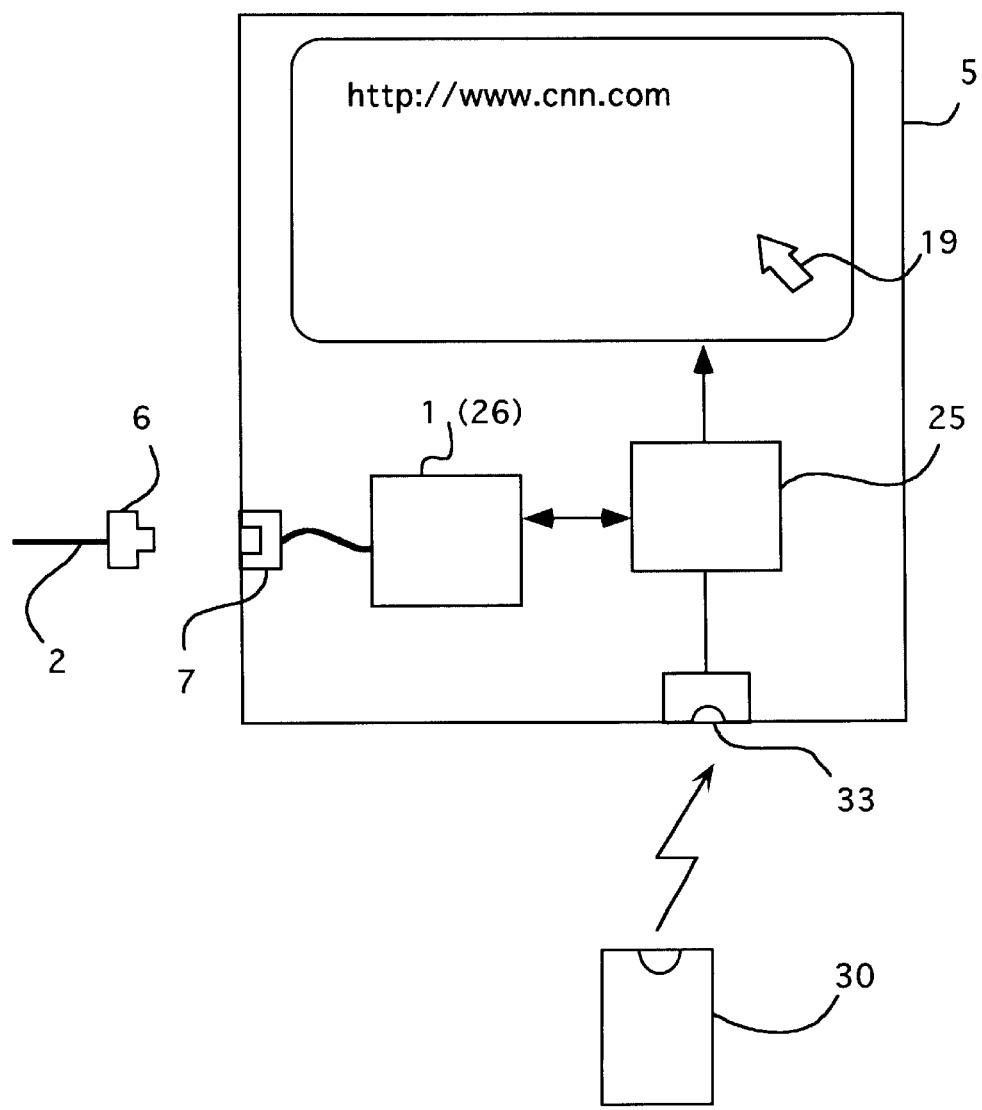
FIG. 8 shows a general configuration of the Internet television device according to the second embodiment of the invention.

Referring to FIGS. 7 and 8, there is shown a second embodiment of the invention. In this embodiment, the internal circuitry of the Internet unit 1 is built in the TV set 5 as Internet circuitry 26 in assembling the TV set 5. This embodiment only differs in appearance from the first embodiment and the operation is substantially the same as that of the first embodiment. The TV set 5 is provided with a television circuit 25, an Internet circuit 26 and a module jack 7, the connecting configuration of these elements being also substantially the same as those in the first embodiment.

The remote controller 30 is the same as in the first embodiment. In FIG. 7, the IR light receiver 33 includes a remote receiver and converts an IR signal into a digital signal to send the same to the CPU 10. The Internet circuit 26, as in the first embodiment, includes the moving list creation program 17 and the button assignment program 27. Instead of the D/A converter 22, a RAMDAC 34 is provided. In the Internet circuit 26, no NTSC signal is needed and hence no flickering occurs without necessity of the flicker reduction circuit 15 as shown in FIG. 5. The audio data from the audio controller 16 is directly sent to the audio circuit where the audio data is restored into an audio signal. Alternatively, the audio data is sent to the audio circuit on the Internet circuit 26.

According to the invention, by the use of the Internet unit 1 or the TV set with the Internet circuit 26, it is possible to enjoy the so-called Internet surfing by the operation of a remote controller as in the conventional TV set, as well as net news or E-mail communication.

The above-described embodiments are just raised by way of example for the purpose of illustration of the invention. The invention will not be limited to them and various changes or modifications can be made without parting from the spirit and scope of the invention. For example, the HTML documents may be obtained via data broadcasting. Further, the embodiments described above are directed only to television, but the invention can be applicable to devices with no capability of receiving broadcast, or devices with no capability of accessing the Internet, unless the devices are capable of displaying HTML documents. Such devices include, for example, display devices for control or guidance. Also, the invention is available in the applications in which an operation is performed with operation buttons associated with the display.

What is claimed is:

1. A method for selecting, with operation buttons, hot spots on a browser display screen in an Internet television device, the method comprising the steps of:

receiving a markup language document from a WEB server;

recognizing button identifiers of operation buttons, said button identifiers being set in the received markup language document in one-to-one correspondence with selected ones of anchor tags existing in the markup language document, wherein said button identifiers are set inside said selected ones of anchor tags;

creating, for each received markup language document, a button assignment table which correlates said recognized button identifiers with hot spots corresponding to said anchor tags to which said button identifiers are assigned;

referring to said button assignment table, based on an operation button operated by a user, to determine which hot spot in the markup language document is indicated; and selecting the thus determined hot spot.

2. The method according to claim 1, wherein the markup language document provided at the side of the WEB server includes a statement put in each of said selected ones of anchor tags, said statement specifying the button identifier of each operation button so as to be recognized by said Internet television device.

3. The method according to claim 1, wherein the markup language document provided at the side of the WEB server includes display information added in the markup language document in association with each hot spot corresponding to each of said anchor tags to which said button identifiers are assigned, said display information indicating which operation button has been assigned to said each hot spot so as to be recognized by a user of said Internet television device.

4. An Internet television device capable of connecting to the Internet, comprising:

a connector for connecting to a WEB server on the Internet;

storage for storing a markup language document received from said WEB server;

an interpreter for interpreting said markup language document to develop an image on an image memory;

a display for displaying the developed image thereon;

a wireless remote controller for remotely controlling said Internet television device;

means for recognizing button identifiers of operation buttons, said button identifiers being set in the received markup language document in one-to-one correspondence with selected ones of anchor tags existing in the markup language document, wherein said button identifiers are set inside said selected ones anchor tags, and for creating, for each markup language document, a button assignment table which correlates said recognized button identifiers with hot spots corresponding to said anchor tags to which said button identifiers are assigned; and a controller for referring to said button assignment table, based on an operation button operated by a user, to determine which hot spot in the markup language document is indicated and for selecting the thus determined hot spot.

5. The Internet television device according to claim 4, further comprising a selector for selecting any one of the hot spots in said markup language document by use of a cursor movement key and a selection key.

6. An external device connected to a television set to provide said television with a capability of connecting to the internet, comprising:

a connector for connecting to a WEB server on the Internet;

storage for storing a markup language document received from said WEB server;

an interpreter for interpreting said markup language document to develop an image on an image memory;

a forwarder for forwarding said image to said television set;

a wireless remote controller for remotely controlling said external device;

a recognizer for recognizing button identifiers of operation buttons, said button identifiers being set in the received markup language document in one-to-one correspondence with selected ones of anchor tags existing in the markup language document, wherein said button identifiers are set inside said selected ones of anchor tags, and for creating, for each received markup language document, a button assignment table which correlates said recognized button identifiers with hot spots corresponding to said anchor tags to which said button identifiers are assigned; and a controller for referring to said button assignment table, based on an operation button operated by a user, to determine which hot spot in the markup language document is indicated and for selecting the thus determined hot spot.

7. The external device according to claim 6, wherein said remote controller is also used as a remote controller for said television set.

8. The external device according to claim 6, further comprising a selector for selecting any one of the hot spots in said markup language document by use of a cursor movement key and a selection key.

9. A method for assigning operation buttons to hot spots displayed on a browser display screen, comprising the steps of:

reading out a markup language document;

recognizing button identifiers being set in the read out markup language document in one-to-one correspondence with selected ones of anchor tags existing in the markup language document, wherein said button identifiers are set inside said selected ones of anchor tags;

creating, for each read-out markup language document, a button assignment table which correlates said recognized button identifiers with hot spots corresponding to said anchor tags to which said button identifiers are assigned;

referring to said button assignment table, based on an operation button operated by a user, to determine which hot spot in the markup language document is indicated; and selecting the thus determined hot spot.

10. A recording medium which has stored a computer program for realizing a method for selecting, with operation buttons, hot spots on a browser display screen in an Internet television device, the method comprising the steps of:

receiving a markup language document from a WEB server;

recognizing button identifiers of operation buttons, said button identifiers being set in the received markup language document in one-to-one correspondence with selected ones of anchor tags existing in the markup language document, wherein said button identifiers are set inside said selected ones of anchor tags;

creating, for each read out markup language document, a button assignment table which correlates said recognized button identifiers with hot spots corresponding to said anchor tags to which said button identifiers are assigned;

referring to said button assignment table, based on an operation button operated by a user, to determine which hot spot in the markup language document is indicated; and selecting the thus determined hot spot.

11. A recording medium which has stored a computer program for realizing a method for assigning operation buttons to hot spots displayed on a browser display screen, said method comprising the steps of:

reading out a markup language document;

recognizing button identifiers being set in the read out markup language document in one-to-one correspondence with selected ones of anchor tags existing in the markup language document, wherein said button identifiers are set inside said selected ones of anchor tags;

creating for each read out markup language document, a button assignment table which correlates said recognized button identifiers with hot spots corresponding to said anchor tags to which said button identifiers are assigned;

referring to said button assignment table, based on an operation button operated by a user, to determine which hot spot in the markup language document is indicated; and selecting the thus determined hot spot.

12. An Internet device capable of connecting to the Internet, comprising:

a connector for connecting to a WEB server on the Internet;

storage for storing a markup language document received from said WEB server;

an interpreter for interpreting said markup language document to develop an image on an image memory;

a display for displaying the developed image thereon;

a recognizer for recognizing button identifiers of operation buttons, said button identifiers being set in the received markup language document in one-to-one correspondence with selected ones of anchor tags existing in the markup language document, wherein said button identifiers are set inside said selected ones of anchor tags, and for creating, for each markup language document, a button assignment table which correlates said recognized button identifiers with hot spots corresponding to said anchor tags to which said button identifiers are assigned; and a controller for referring to said button assignment table, based on an operation button operated by a user, to determine which hot spot in the markup language document is indicated and for selecting the thus determined hot spot.

13. The Internet device according to claim 12, further comprising a selector for selecting any one of the hot spots in said markup language document by use of a cursor movement key and a selection key.

* * * * *